US010299075B2

(12) United States Patent
Gao et al.

(10) Patent No.: US 10,299,075 B2
(45) Date of Patent: May 21, 2019

(54) POSITION INFORMATION PROCESSING METHOD AND ELECTRONIC DEVICE

(71) Applicant: Lenovo (Beijing) Limited, Beijing (CN)

(72) Inventors: Tian Gao, Beijing (CN); Liuxin Zhang, Beijing (CN); Qichuan Yang, Beijing (CN)

(73) Assignee: Lenovo (Beijing) Limited, Singapore (SG)

( * ) Notice: Subject to any disclaimer, the term of this patent is extended or adjusted under 35 U.S.C. 154(b) by 161 days.

(21) Appl. No.: 15/394,787

(22) Filed: Dec. 29, 2016

(65) Prior Publication Data

US 2017/0195840 A1    Jul. 6, 2017

(30) Foreign Application Priority Data

Dec. 30, 2015    (CN) .......................... 2015 1 1021553

(51) Int. Cl.
*H04W 4/23*    (2018.01)
*H04W 4/02*    (2018.01)

(52) U.S. Cl.
CPC .......... *H04W 4/023* (2013.01); *H04W 4/027* (2013.01)

(58) Field of Classification Search
CPC ......... H04W 64/00; H04W 4/23; G08B 25/10
See application file for complete search history.

(56) References Cited

U.S. PATENT DOCUMENTS

| 2007/0124062 | A1* | 5/2007 | Janky | G08B 25/10 701/468 |
| 2008/0180228 | A1* | 7/2008 | Wakefield | G01S 5/0252 340/4.62 |
| 2013/0281120 | A1* | 10/2013 | Oka | H04W 64/00 455/456.2 |

FOREIGN PATENT DOCUMENTS

| CN | 104155938 A | 11/2014 |
| CN | 104181902 A | 12/2014 |
| CN | 104582176 A | 4/2015 |
| CN | 104898603 A | 9/2015 |
| CN | 104914834 A | 9/2015 |

* cited by examiner

*Primary Examiner* — Myron Wyche
(74) *Attorney, Agent, or Firm* — Ference & Associates LLC

(57) ABSTRACT

An embodiment provides an electronic device, including: a wireless communication unit; and a processor operatively coupled to the wireless communication unit; and a memory that stores instructions executable by the processor to: scan and acquire wireless device signal data; determine, based on the wireless device signal data, that the electronic device is within a preset range of a wireless device; and determine a geographic position of the electronic device based on the electronic device being within the preset range. Other aspects are described and claimed.

20 Claims, 3 Drawing Sheets

POSITION INFORMATION PROCESSING METHOD AND ELECTRONIC DEVICE

CLAIM FOR PRIORITY

This application claims priority to Chinese Application No. 201511021553.6, filed on Dec. 30, 2015, the contents of which are fully incorporated by reference herein.

TECHNICAL FIELD

The subject matter relates to the technical field of electronic technologies, and in particular to an information processing method and an electronic device.

BACKGROUND

With the rapid development of science and technology, the performance and appearance of electronic devices are greatly improved, and various electronic devices with different functions provide more convenient and intelligent services in people's daily lives. Many electronic devices have a positioning function, such that a user can promptly know their own location. In the prior art, when positioning of a target device is realized, the location of the positioned target device is realized typically through a satellite. However, typically the satellite positioning manner can only position an area where the target device is located, and cannot accurately position specific coordinates of the device in the area, thus the positioning accuracy is lower.

BRIEF SUMMARY

In summary, one aspect provides an electronic device, comprising: a wireless communication unit; and a processor operatively coupled to the wireless communication unit; and a memory that stores instructions executable by the processor to: scan and acquire wireless device signal data; determine, based on the wireless device signal data, that the electronic device is within a preset range of a wireless device; and determine a geographic position of the electronic device based on the electronic device being within the preset range.

Another aspect provides a method, comprising: scanning and acquiring wireless device signal data using a mobile device; determining, based on the wireless device signal data, that the mobile device is within a preset range of a wireless device; and determining a geographic position of the mobile device based on the mobile device being within the preset range.

A further aspect provides a computer program product, comprising: a computer readable storage device comprising code that is executable by a processor, the code comprising: code that scans and acquires wireless device signal data using a mobile device; code that determines, based on the wireless device signal data, that the mobile device is within a preset range of a wireless device; and code that determines a geographic position of the mobile device based on the mobile device being within the preset range.

The foregoing is a summary and thus may contain simplifications, generalizations, and omissions of detail; consequently, those skilled in the art will appreciate that the summary is illustrative only and is not intended to be in any way limiting.

For a better understanding of embodiments, together with other and further features and advantages thereof, reference is made to the following description, taken in conjunction with the accompanying drawings, and the scope of the invention will be pointed out in the appended claims.

DETAILED DESCRIPTION

Figure 1:
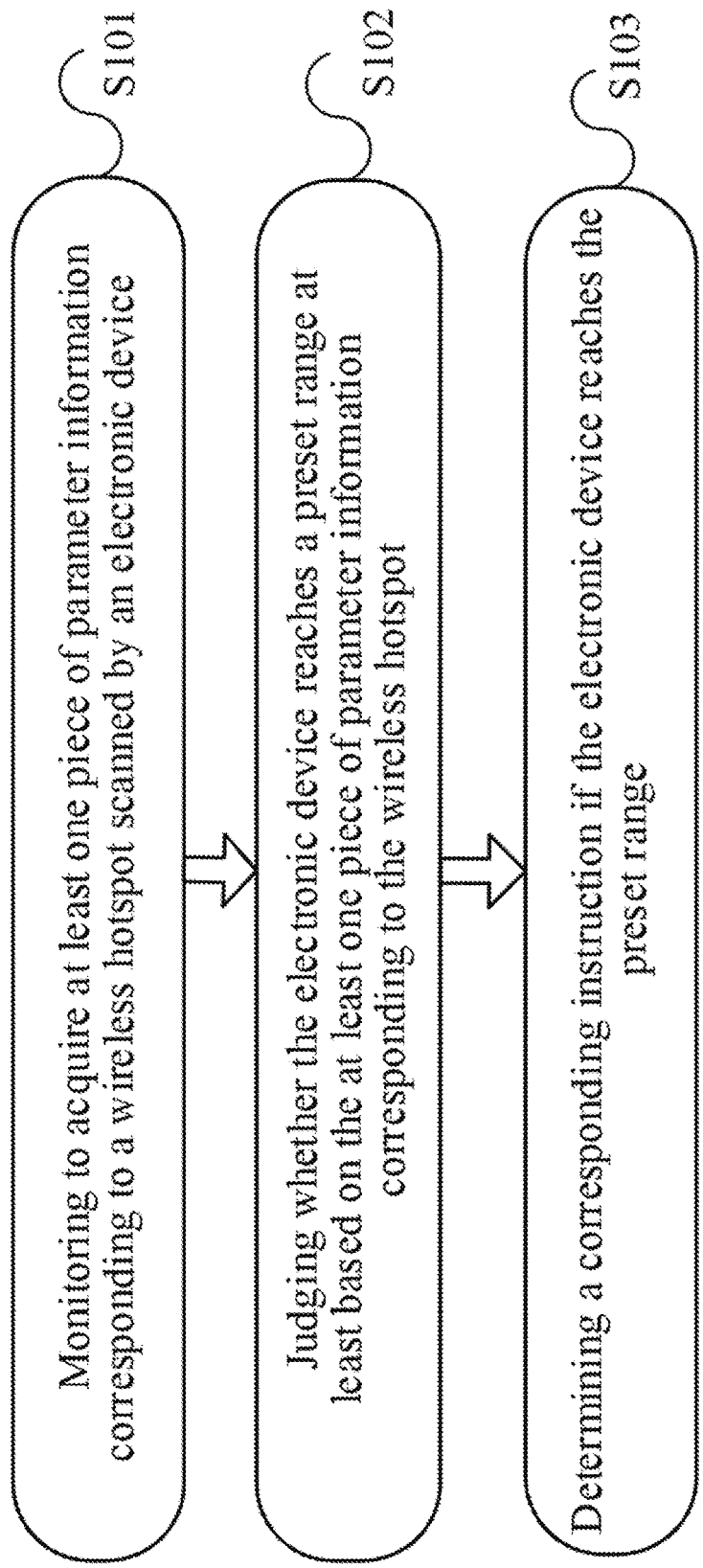
FIG. 1 is a flow diagram of an example information processing method according to an embodiment.
Figure 2:
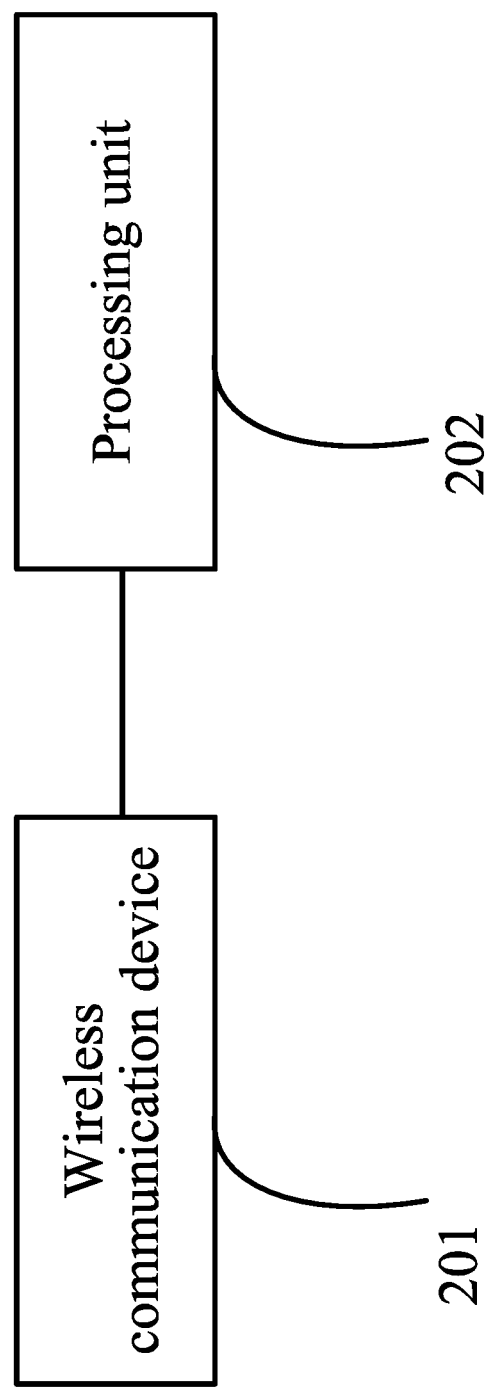
FIG. 2 is a structural diagram of an example electronic device according to an embodiment.
Figure 3:
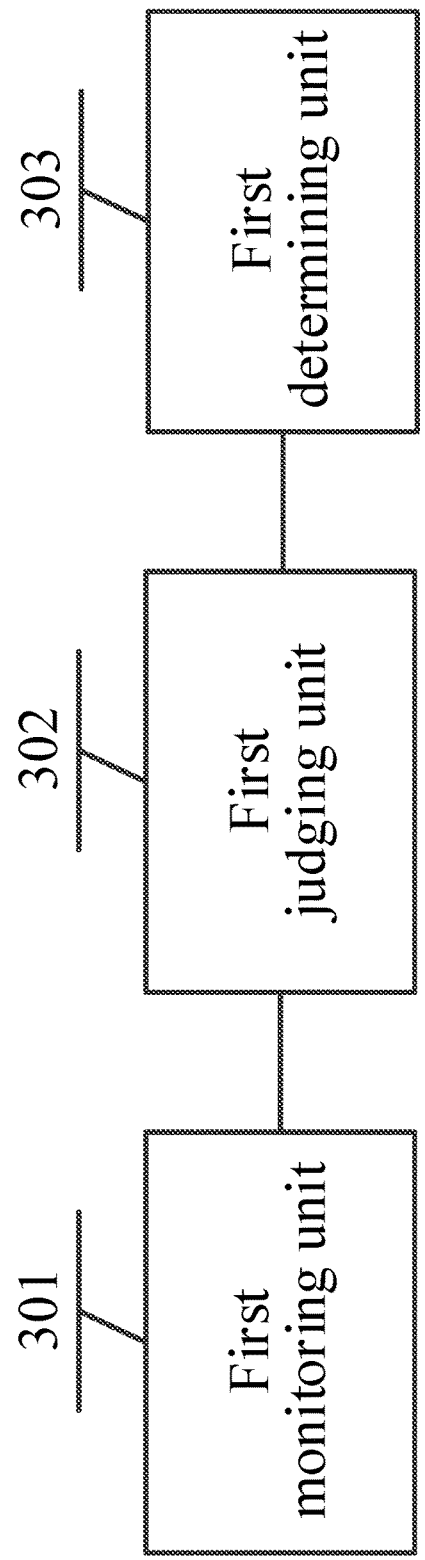
FIG. 3 is a structural diagram of an example electronic device according to an embodiment.

It will be readily understood that the components of the embodiments, as generally described and illustrated in the figures herein, may be arranged and designed in a wide variety of different configurations. Thus, the following more detailed description of the embodiments of the present invention, as represented in FIGS. 1 through 3 is not intended to limit the scope of the embodiments, as claimed, but is merely representative of selected embodiments.

Reference throughout this specification to "one embodiment" or "an embodiment" (or the like) means that a particular feature, structure, or characteristic described in connection with the embodiment is included in at least one embodiment. Thus, appearances of the phrases "in one embodiment" or "in an embodiment" in various places throughout this specification are not necessarily all referring to the same embodiment.

Furthermore, the described features, structures, or characteristics may be combined in any suitable manner in one or more embodiments. In the following description, numerous specific details are provided, to provide a thorough understanding of embodiments. One skilled in the relevant art will recognize, however, that an embodiment can be practiced without one or more of the specific details, or with other methods, components, materials, etc. In other instances, well-known structures, materials, or operations are not shown or described in detail to avoid obfuscation. The following description is intended only by way of example, and simply illustrates certain example embodiments.

An information processing method and an electronic device may be used for solving the technical problems including that the positioning accuracy is low, and user needs are not met.

An information processing method in accordance with an embodiment provides: monitoring to acquire at least one piece of data corresponding to a wireless hotspot scanned by an electronic device; judging whether the electronic device reaches a preset range at least based on the at least one piece of data corresponding to the wireless hotspot; and determining a corresponding instruction if the electronic device reaches the preset range.

A technical solution of the embodiments includes: monitoring to acquire at least one piece of data corresponding to a wireless hotspot scanned by an electronic device; judging whether the electronic device reaches a preset range at least based on the at least one piece of data corresponding to the wireless hotspot; and determining a corresponding instruction if the electronic device reaches the preset range. In this way, the electronic device can determine whether the electronic device reaches a preset range according to data corresponding to a scanned wireless hotspot, and a new positioning manner is provided. When positioning is performed through the data corresponding to the wireless hotspot, an accurate location can be positioned. Therefore, the technical problems of the positioning accuracy being low, and user needs not being met, can be effectively solved, and a technical effect of accurate positioning is achieved.

Embodiment 1

An information processing method according to an embodiment may be applied to an electronic device, where the electronic device may be a mobile phone, a tablet computer, a smart watch or the like. The electronic device may also be a central or control type of electronic device, e.g., configured to receive at least one piece of data sent by an electronic device such as a mobile phone or a tablet computer and corresponding to a wireless hotspot. Further, the central or control type of electronic device can judge whether the electronic device reaches a preset range at least based on the at least one piece of data corresponding to the wireless hotspot, and a corresponding instruction may be determined when the electronic device reaches the preset range. Certainly, other electronic devices may be used, but they will not be illustrated one by one herein.

Referring to FIG. 1, an embodiment provides an information processing method, comprising, at S101, monitoring to acquire at least one piece of data corresponding to a wireless hotspot scanned by an electronic device. At S102 it is judged whether the electronic device reaches a preset range at least based on the at least one piece of data corresponding to the wireless hotspot; and at S103 a corresponding instruction is determined if the electronic device reaches the preset range.

In one non-limting example, the electronic device may monitor to acquire at least one piece of data corresponding to the wireless hotspot scanned by the electronic device. For example, the electronic device may acquire the data corresponding to the wireless hotspot through real-time scanning of a communication module, and the data corresponding to the wireless hotspot may be information (name and signal strength) corresponding to the scanned wireless hotspot, and may certainly be other information, and therefore it is not limited. The electronic device may monitor to acquire data corresponding to wireless hotspots scanned by the electronic device at different moments.

The electronic device may determine whether the electronic device reaches a preset range based on at least one piece of data acquired by monitoring. For example, when at least one piece of data corresponding to a monitored wireless hotspot includes name information of the wireless hotspot, whether the name information contains a name of a preset hotspot may be determined, and thus when the name information of the wireless hotspot contains the name of the preset hotspot, it may be determined that a wireless hotspot scanned by the electronic device may include a preset wireless hotspot. Further, it may be determined that the electronic device reaches a preset range where the preset wireless hotspot is located.

When at least one piece of data corresponding to a monitored wireless hotspot includes name information and signal strength information of the wireless hotspot, whether the name information contains a name of a preset hotspot may be determined, and thus when the name information of the wireless hotspot contains the name of the preset hotspot, it may be determined that a wireless hotspot scanned by the electronic device includes the preset wireless hotspot. Because signal intensities of preset hotspots detected by the electronic device at different positions can meet some rules, whether the electronic device reaches a preset range is further determined through the signal strength change rules corresponding to the preset hotspots at different moments, wherein the preset hotspots correspond to the preset range. The method of determining the position of the electronic device based on at least one piece of data corresponding to a detected wireless hotspot may be set as desired, therefore it is not limited.

Because the electronic device may determine whether the electronic device reaches a preset range according to data corresponding to a scanned wireless hotspot, a new positioning manner is provided. When positioning is performed through the data corresponding to the wireless hotspot, an accurate location can be determined. Therefore, the technical problems of limited positioning manner in conventional techniques where the positioning accuracy is low, and user needs are not met, can be effectively solved, and a technical effect of accurate positioning is achieved.

When it is determined that the electronic device reaches the preset range, a corresponding instruction may be determined. Determining the instruction may comprise the following two methods.

A first method includes, after determining that the preset range is reached, the electronic device may generate at least one control instruction, so as to control at least one second electronic device to turn on a corresponding function. For example, a user returns home carrying a mobile phone, and when the mobile phone determines that the location of a home door is reached, the mobile phone may generate an instruction for controlling a lamp at home to be turned on, and an instruction for controlling other electronic devices such as an air conditioner to turn on corresponding functions. Further, after the relevant instructions are sent to the corresponding electronic devices, the electronic devices may turn on the corresponding functions in response to the corresponding instructions.

A second manner includes, after determining that the preset range is reached, the electronic device may generate an informing instruction, and send the informing instruction to a second electronic device. After receiving the informing instruction, the second electronic device may determine at least one control instruction corresponding to the informing instruction, used for controlling at least one third electronic device to turn on a corresponding function. In one non-limiting example, a user returns home carrying a mobile phone, and when the mobile phone determines that the location of a home door is reached, the mobile phone may generate an informing instruction, and may send the informing instruction to a control device at home, and further the control device may acquire an instruction for controlling a lamp at home to be turned on, corresponding to the informing instruction, and an instruction for controlling other electronic devices such as an air conditioner to turn on corresponding functions, corresponding to the informing instruction. Further, after the control device sends the relevant instructions to the corresponding electronic devices, the electronic devices may turn on the corresponding functions in response to the corresponding instructions.

Without the help of other auxiliary sensors (such as a sensor arranged on a door), the location of a user, such as a location near the door, corresponding to door opening, door closing, entering and exiting, and even behaviors of the user, such as door opening, door closing, entering and exiting, can be accurately known. Thus, when the electronic device determines that the preset range is reached or detects that the behavior of the user is a preset behavior, inter-device linkage may be timely and accurately triggered, such that electronic devices in the area where the preset range is located turn on corresponding functions. For example, when the door opening behavior is detected or the condition that the user reaches the position of the door is detected at night, a lamp indoors may be triggered to be turned on, and the needs of the user are better met.

At step S102 it is judged whether the electronic device reaches a preset range at least based on the at least one piece of data corresponding to the wireless hotspot. Implementation modes may comprise the following two cases.

The First Case

Whether the electronic device reaches the preset range is determined only through data corresponding to a wireless hotspot. In the first case, the implementation mode of step S102 may comprise the following steps, i.e., judging whether the scanned wireless hotspot includes a preset wireless hotspot based on identifier information corresponding to the wireless hotspot; acquiring signal strength change information used for indicating the signal strength change of the preset wireless hotspot if the scanned wireless hotspot includes the preset wireless hotspot; and judging whether the electronic device reaches the preset range based on the signal strength change information.

The identifier information of the wireless hotspot may be a name, a MAC (Media Access Control) address, a SSID (Service Set Identifier), and the like corresponding to the wireless hotspot, and can also be other information, and in the specific implementation process, the identifier information of the wireless hotspot can comprise one or more, therefore it is not limited.

The step of judging whether the electronic device reaches the preset range based on the signal strength change information may include, but is not be limited to, the following two manners.

A first manner includes acquiring first amplitude change of the signal strength of the preset wireless hotspot within a first preset time range, and judging whether the first amplitude change is greater than a first threshold, so as to acquire a first judgment result; and judging whether the electronic device reaches the preset range at least based on the first judgment result.

When it is determined that a wireless hotspot scanned by the electronic device includes a preset hotspot, signal intensities corresponding to the preset hotspot may be monitored at different moments. For example, a wireless communication module of the electronic device scans the wireless hotspots at a preset time interval, and the electronic device records wireless hotspots scanned each time by the wireless communication module and a corresponding signal strength, and further the electronic device may detect signal strength changes of the preset hotspot within a preset time range.

The electronic device may detect a signal strength of the preset hotspot at a current moment is −35 dbm, a signal strength of the preset hotspot at a moment prior to the current moment is −55 dbm, a time interval from the previous moment to the current moment is 1 second, 2 seconds or 3 seconds, and the like. Signal strength may change amplitude corresponding to the preset hotspot within the preset time range is 20 dbm.

The electronic device may judge whether a first amplitude change of the signal strength of a preset wireless hotspot within a first preset time range is greater than a first threshold, and may determine that the electronic device reaches a preset range when determining that the first amplitude change is greater than the first threshold, wherein the first threshold may be an experience value pre-stored in the electronic device and related to the preset range when the amplitude change of the signal strength of the preset hotspot meets a preset rule. In one non-limiting example, the electronic device may reach a range where the home of a user is located is judged, according to multiple readings, the strength amplitude change of a wireless signal sent out by a wireless hotspot at home is greater than 18 dbm at the moment when the user opens or closes a door, therefore, the first threshold can be set as 18 dbm. Further, when it is detected that the first amplitude change of the signal strength of the preset hotspot within the first preset time range is 20 dbm and greater than the first threshold of 18 dbm, it may be determined that the electronic device reached the range where the home of the user is located.

For further accurately positioning through the signal strength change information of a preset hotspot, the step of judging whether the electronic device reaches the preset range at least based on the first judgment result may also comprise the following steps, i.e., acquiring second amplitude change of the signal strength of the preset wireless hotspot within a second preset time range, judging whether the second amplitude change is greater than a second threshold, so as to acquire a second judgment result; and judging whether the electronic device reaches the preset range based on the first judgment result and the second judgment result. If the first judgment result and the second judgment result are both positive, it is determined that the electronic device reaches the preset range, and the first preset time range is not coincident with the second preset time range.

Whether the first amplitude change of the signal strength of the wireless hotspot within the first preset time range is greater than a first threshold needs to be judged; and whether the second amplitude change of the signal strength of a preset wireless hotspot within the second preset time range not coincident with the first preset time range is greater than a second threshold also needs to be judged; and when the first amplitude change is greater than the first threshold and the second amplitude change is greater than the second threshold, it may be determined that the electronic device has reached the preset range.

In one example, a user may return home carrying a mobile phone, when the user goes downstairs to the basement, a wireless signal sent out by a wireless home router may be scanned, at that moment, the strength of the monitored wireless signal sent out by the wireless home router is either detectable or non-detectable, i.e., the second amplitude change of the signal strength of a preset wireless hotspot within the second preset time range is greater than the second threshold, the second threshold is a smaller value, and can be set as 0.5 dbm, 1 dbm and the like, and indicates that the signal strength of the preset wireless hotspot slowly changes within the second preset time range.

When the user gets home and opens a door, the strength of the wireless signal sent out by the wireless home router may suddenly change, i.e., the first amplitude change of the signal strength of the preset wireless hotspot within the first preset time range is greater than the first threshold, the first threshold is a greater value, and can be set as 10 dbm, 15 dbm and the like, and indicates that the signal strength of the preset wireless hotspot suddenly changes within the first preset time range.

When the mobile phone determines that the second amplitude change of the signal strength of the wireless signal sent out by the wireless home router within the second preset time range is greater than the second threshold, and the first amplitude change within the first preset time range is greater than the first threshold, the mobile phone may determine that it has reached the range of a home door.

When the user leaves the house carrying the mobile phone, at the moment the door closes, the wireless signal sent out by the wireless home router may suddenly change, i.e., the first amplitude change of the signal strength of the preset wireless hotspot within the first preset time range is greater than the first threshold, the first threshold is a greater value, and may be set as 10 dbm, 15 dbm and the like, and indicates that the signal strength of the preset wireless hotspot suddenly changes within the first preset time range. Then as the user gets farther and farther from home, the strength of the monitored wireless signal sent out by the wireless home router accords with a characteristic being from existence to nonexistence, i.e., the second amplitude change of the signal strength of the preset wireless hotspot within the second preset time range is greater than the second threshold, the second threshold is a smaller value, and can be set as 0.5 dbm, 1 dbm and the like, and indicates that the signal strength of the preset wireless hotspot slowly changes within the second preset time range. When the mobile phone determines that the first amplitude change of the signal strength of the wireless signal sent out by the wireless home router within the first preset time range is greater than the first threshold, and the second amplitude change within the second preset time range is greater than the second threshold, the mobile phone may determine that it has departed from the range of the home door.

To more accurately achieve positioning through the signal strength change information of a preset hotspot, the step of judging whether the electronic device reaches the preset range based on the first judgment result and the second judgment result may also comprise the following steps, i.e., judging whether a unit time change rate of the first amplitude change within the first preset time range and that of the second amplitude change within the second preset time range are different, so as to acquire a third judgment result; judging whether a direction change corresponding to the first amplitude change and a direction change corresponding to the second amplitude change are consistent, so as to acquire a fourth judgment result; and judging whether the electronic device reaches the preset range based on the judgment results. If the judgment results are all positive, it may be determined that the electronic device has reached the preset range.

The consistency of direction changes corresponding to the two processes, such as increased changes or decreased changes, needs to be ensured. If the two processes of the electronic device occur in the changes of the signal strength corresponding to the preset wireless hotspot detected by the electronic device, and the change directions of the two change processes are consistent, it may be determined that the electronic device has reached the preset range.

Whether the first amplitude change of the signal strength of the wireless hotspot within the first preset time range is greater than the first threshold needs to be judged. Whether the second amplitude change of the signal strength of a preset wireless hotspot within the second preset time range not coincident with the first preset time range is greater than the second threshold needs to be judged. Whether a unit time change rate of the first amplitude change within the first preset time range and a unit time change rate of the second amplitude change within the second preset time range are different needs to be judged. Whether a direction change corresponding to the first amplitude change and a direction change corresponding to the second amplitude change are consistent also needs to be judged.

When the first amplitude change is greater than the first threshold and the second amplitude change is greater than the second threshold, the unit time change rate of the first amplitude change within the first preset time range and the unit time change rate of the second amplitude change within the second preset time range are different, and when the direction change corresponding to the first amplitude change and the direction change corresponding to the second amplitude change are consistent, it may be determined that the electronic device has reached the preset range.

In one non-limiting example, a user returns home carrying a mobile phone, when the user goes downstairs to the basement, a wireless signal sent out by a wireless home router is scanned, at that moment, the strength of the monitored wireless signal sent out by the wireless home router is either detectable or non-detectable, i.e., the second amplitude change of the signal strength of a preset wireless hotspot within the second preset time range is greater than the second threshold, the second threshold is a smaller value, and can be set as 0.5 dbm, 1 dbm and the like, and indicates that the signal strength of the preset wireless hotspot slowly changes within the second preset time range. At the moment when the user gets home and opens a door, the strength of the wireless signal sent out by the wireless home router may suddenly change, i.e., the first amplitude change of the signal strength of the preset wireless hotspot within the first preset time range is greater than the first threshold, the first threshold is a greater value, and can be set as 10 dbm, 15 dbm and the like.

The mobile phone may acquire the first amplitude change within the first preset time range is 20 dbm, for example. The second amplitude change within the second preset time range may be 1 dbm, for example. The time span of both the first preset time range and the second preset time range may be 2 seconds, for example. The unit time change rate of the first amplitude change within the first preset time range is 10 dbm/second, for example. The unit time change rate of the second amplitude change within the second preset time range is 0.5 dbm/second, for example. The the unit time change rate, being 10 dbm/second, for example, of the first amplitude change within the first preset time range and the unit time change rate, being 0.5 dbm/second, for example, of the second amplitude change within the second preset time range are different. This indicates that the strength change of the signal sent out by the wireless home router, detected by the mobile phone, experienced a slow change process and a sudden change process.

Whether the direction change corresponding to the first amplitude change and the direction change corresponding to the second amplitude change are consistent also may be determined. For example, the first amplitude change corresponds to the signal strength changing from −55 dbm to −35 dbm, and the signal strength direction change increases; the second amplitude change corresponds to the signal strength changing from −120 dbm to −119 dbm, and the signal strength direction change increases; the direction change corresponding to the first amplitude change and the direction change corresponding to the second amplitude change are consistent.

When the mobile phone determines that the second amplitude change of the signal strength of the wireless signal sent out by the wireless home router within the second preset time range is greater than the second threshold, the first amplitude change within the first preset time range is greater than the first threshold, the unit time change rate of the first amplitude change within the first preset time range and the unit time change rate of the second amplitude change within the second preset time range are different, and the direction change corresponding to the first amplitude change and the direction change corresponding to the second amplitude change are consistent, the mobile phone determines that it has reached the range of a home door.

In another non-limting example, when the user leaves the house carrying the mobile phone, two signal change processes may be detected. One process is that at the moment the door closes, the strength of the wireless signal sent out by the wireless home router may suddenly change, i.e., the first amplitude change of the signal strength of the preset wireless hotspot within the first preset time range is greater than the first threshold, the first threshold is a greater value, and can be set as 10 dbm, 15 dbm and the like, and indicates that the signal strength of the preset wireless hotspot suddenly changes within the first preset time range. The second process is that as the user carrying the mobile phone gets farther and farther from home, the strength of the monitored wireless signal sent out by the wireless home router accords with a characteristic being from existence to nonexistence, i.e., the second amplitude change of the signal strength of the preset wireless hotspot within the second preset time range is greater than the second threshold, the second threshold is a smaller value, and can be set as 0.5 dbm, 1 dbm and the like, and indicates that the signal strength of the preset wireless hotspot slowly changes within the second preset time range.

When the mobile phone acquires that the first amplitude change within a preset time range and a second amplitude change within the preset time range that are different, this indicates that the strength change of the signal sent out by the wireless home router, detected by the mobile phone, has changed over time. For example, this may include the mobile phone experiencing a slow change process and a sudden change process, i.e., if the first amplitude is greater than the second amplitude.

Whether the direction change corresponding to the first amplitude change and the direction change corresponding to the second amplitude change are consistent also may be determined. For example, the first amplitude change corresponds to the signal strength changing from −35 dbm to −55 dbm, and the signal strength direction change decreases; the second amplitude change corresponds to the signal strength changing from −119 dbm to −120 dbm, and the signal strength direction change decreases; the direction change corresponding to the first amplitude change and the direction change corresponding to the second amplitude change are consistent.

When the mobile phone determines that the second amplitude change of the signal strength of the wireless signal sent out by the wireless home router within the second preset time range is greater than the second threshold, the first amplitude change within the first preset time range is greater than the first threshold, the unit time change rate of the first amplitude change within the first preset time range and the unit time change rate of the second amplitude change within the second preset time range are different, and the direction change corresponding to the first amplitude change and the direction change corresponding to the second amplitude change are consistent, the mobile phone determines that it has departed from the range of the home door. Those of ordinary skill in the art will appreciate that the first preset time range and the second preset time range may be set as desired and are not to be limited by any described examples.

If the electronic device experiences two signal strength change processes, i.e., a sudden change process and a slow change process, it may be necessary to determine when the electronic device reaches the preset range and when the direction change of the two signal strength changes are consistent, so that errors may be avoided.

In one non-limiting example when it is determined that the electronic device reaches the preset range based only on the sudden change of signal strength, an error may be caused because the change in signal strength amplitude at the moment when the user gets home and opens the door may possibly be the same as the signal strength amplitude change at the moment when the user opens a bedroom door and moves to a living room.

The step of judging whether the electronic device reaches the preset range based on the signal strength change information may be accomplished in a second manner though the steps, including, but not limited to acquiring first change information within a third preset time range and second change information within a fourth preset time range of the signal strength of the preset wireless hotspot, wherein the third preset time range and the fourth preset time range are not coincident; judging whether the first change information and the second change information meet preset conditions, so as to acquire a fifth judgment result; and judging whether the electronic device reaches the preset range based on the fifth judgment result, wherein if the fifth judgment result is positive, it is determined that the electronic device reaches the preset range.

The electronic device may further detect signal strength changes of the preset hotspot within two non-overlapping preset time ranges. For example, information, such as amplitude change and direction change of the signal strength of the preset hotspot. Further, whether the electronic device reaches the preset range is judged by judging whether the signal strength change information of the preset hotspot within two non-overlapping preset time ranges meet preset conditions. In one non-limiting example, the signal strength change information of the preset hotspot within two non-overlapping preset time ranges, being the amplitude change and/or direction change of the signal strength within the third preset time range, and the amplitude change and/or direction change of the signal strength within the fourth preset time range, may be acquired. The preset conditions may be whether the amplitude change of the signal strength within the third preset time range is greater than a first preset value and whether the amplitude change of the signal strength within the fourth preset time range is greater than a second preset value; and/or whether the direction change of the signal strength within the third preset time range and the direction change of the signal strength within the fourth preset time range are consistent. It will be appreciated by those of ordinary skill in the art that the preset conditions may be selected as desired, therefore they are not to be limited by the examples. Likewise it will be appreciated that the third preset time range and the fourth preset time range may also be set as desired and are therefore not to be limited by the examples.

Accordingly, the electronic device may determine whether the electronic device has reached the preset range through the changes of signal intensities corresponding to a wireless hotspot within two non-overlapping preset time ranges, thus such a positioning manner is more accurate, and a technical effect of accurate positioning is achieved.

The Second Case

Whether the electronic device has reached the preset range may be determined through data corresponding to a wireless hotspot and motion state information of the electronic device. In the second case, step S102 may further comprise detecting to acquire motion state information of the electronic device; and judging whether the electronic device has reached the preset range based on the data corresponding to the wireless hotspot and the motion state information.

The judging whether the electronic device reaches the preset range based on the data corresponding to the wireless hotspot and the motion state information may further comprise judging whether the scanned wireless hotspot includes a preset wireless hotspot based on identifier information corresponding to the wireless hotspot; judging whether the motion state of the electronic device is switched from a first state to a second state based on the motion state information if the scanned wireless hotspot includes the preset wireless hotspot, wherein motion amplitude corresponding to the first state and motion amplitude corresponding to the second state are different; and determining that the electronic device has reached the preset range if the motion state of the electronic device is switched from the first state to the second state.

The electronic device may include different types of sensors, such as an acceleration sensor, a gravity sensor and a gyroscope sensor, which may be arranged to detect the motion state of the electronic device, and further the motion state of the electronic device may be determined through one or more parameters detected by these sensors. Whether the electronic device is static or moving, the magnitude of motion amplitude and the like may be determined through the acceleration sensor.

At least one piece of data corresponding to a wireless hotspot monitored by the electronic device may contain identifier information for the wireless hotspot, whether the identifier information contains an identifier of a preset hotspot may be judged, and thus when the identifier information of the wireless hotspot contains the identifier of the preset hotspot, the condition that the wireless hotspot scanned by the electronic device may contain a preset wireless hotspot. The identifier information of the wireless hotspot may be a name, a MAC (Media Access Control) address, a SSID (Service Set Identifier), and the like corresponding to the wireless hotspot, and may also be other information, and this example does not include all the appropriate information that may be used in an embodiments.

The electronic device may acquire motion state information of the electronic device corresponding to different moments, whether the electronic device is switched between two motion states with different motion amplitudes may be determined, and if so, it may be determined that the electronic device reached a preset range.

For example, when a user returns home carrying a mobile phone, when the user goes downstairs to the basement, a wireless signal sent out by a wireless home router is scanned, acquired identifier information corresponding to a wireless hotspot comprises identifier information corresponding to the wireless home router, and at that moment, one or more parameters detected by an acceleration sensor, a gravity sensor, a gyroscope sensor and the like in the mobile phone may be used for determining whether the mobile phone is switched between two motion states with different motion amplitudes. When the user returns home, staying at a door for a while to open the door is needed before entering, and therefore, under this condition, the motion states of the mobile phone correspondingly go from moving to static, and the motion amplitudes corresponding to the motion states also equate with certain characteristics. For example, when acceleration detected by the acceleration sensor changes from 4 m/s$^2$ to 0 m/s$^2$, the mobile phone may determine that it has reached the range of the home door.

When a user leaves home carrying the mobile phone, one or more parameters detected by the acceleration sensor, the gravity sensor, the gyroscope sensor and the like in the mobile phone are used for determining whether motion states of the mobile phone are switched between two motion states with different motion amplitudes. When the user leaves home, staying at the door for a while to close the door is needed before leaving. Therefore, under this condition, the motion states of the mobile phone correspondingly go from static to moving, and the motion amplitudes corresponding to the motion states also accord with certain characteristics. For example, when acceleration detected by the acceleration sensor changes from 0 m/s$^2$ to 4 m/s$^2$, and when the user carrying the mobile phone gets farther and farther from home, the condition that the signal strength corresponding to the wireless hotspot at home is weaker and weaker can be detected, and when the condition that the signal strength becomes 0 is detected, the condition that the mobile phone departs from the range of the home is determined.

For more accurately positioning, whether the electronic device reaches the preset range may be determined by combining change information of the signal strength of the preset hotspot, and the step of determining that the electronic device reaches the preset range if the motion state of the electronic device is switched from the first state to the second state may also comprise the following steps, i.e., acquiring third amplitude change of the signal strength of the preset wireless hotspot within a fifth preset time range if the motion state of the electronic device is switched from the first state to the second state; and judging whether the third amplitude change is greater than a third threshold, and if so, determining that the electronic device reaches the preset range.

After the condition that the electronic device is switched between two different motion states of motion amplitude is determined, the amplitude change of the signal strength corresponding to a preset hotspot within a preset time range corresponding to a current moment is acquired, whether the amplitude change is greater than a third threshold, and if so, it is determined that the electronic device reaches a preset range.

When a user returns home carrying a mobile phone, when the user goes downstairs to the basement, a wireless signal sent out by a wireless home router may be scanned, it may be detected that the signal strength corresponding to a wireless hotspot goes from weak to strong, and in the process that the user returns home, staying at a door for a while to open the door is needed before entering, and therefore, under this condition, the motion states of the mobile phone correspondingly may go from moving to static, and further, at the moment the door opens, the signal strength of the wireless hotspot at home may suddenly change.

Therefore, the mobile phone may determine whether the wireless signal sent out by the wireless hotspot at home is scanned, and if the wireless signal sent out by the wireless hotspot at home is scanned, whether the signal strength corresponding to the wireless hotspot corresponds to two change processes, i.e., one process is that the wireless signal strength amplitude is slowly strengthened, and the other process is that the wireless signal strength amplitude suddenly increases; and whether a state change process from moving to static of the motion states of the mobile phone exists needs to be judged. If the aforementioned conditions are met, it may determined that the mobile phone has reached the location of a house door.

For example, when a user returns home carrying a mobile phone, when the user goes downstairs to the basement, a wireless signal sent out by a wireless home router may be scanned, acquired identifier information corresponding to a wireless hotspot may comprise identifier information corresponding to the wireless home router, and it may be determined that the strength amplitude change of the wireless signal slowly increases; one or more parameters detected by an acceleration sensor, a gravity sensor, a gyroscope sensor and the like in the mobile phone are used for determining whether the motion states of the mobile phone are switched between two motion states with different motion amplitudes. For example, when acceleration detected by the acceleration sensor changes from 4 m/s$^2$ to 0 m/s$^2$, the mobile phone continuously monitors the strength change situation of the wireless signal sent by the wireless home router, detected by the mobile phone.

At the moment when a user gets home and opens a door, the strength of a wireless signal sent out by a wireless home router may suddenly change, i.e., the third amplitude change of the signal strength of a preset wireless hotspot within a fifth preset time range is greater than a third threshold, the first threshold is a greater value, and can be set as 10 dbm, 15 dbm and the like, and indicates that the signal strength of the preset wireless hotspot suddenly changes within the fifth preset time range. When it is determined that the signal strength of the wireless signal sent out by the wireless home router suddenly changes, the mobile phone may determine that it has reached the range of the home door.

The electronic device may determine whether it reached a preset range through data corresponding to a wireless hotspot and motion state information of the electronic device. Such a positioning method is more accurate, and a technical effect of accurate positioning is achieved.

Power consumption may be higher when the wireless hotspot is scanned through a wireless communication module. In order to further control power consumed by positioning, before the step of monitoring to acquire at least one piece of data corresponding to the wireless hotspot scanned by the electronic device, the information processing method in the present embodiment may also comprise the following steps, i.e., turning on a positioning unit of the electronic device, and acquiring a geographic location of the electronic device through the positioning unit; judging whether the geographic location is in a preset area where the preset range is located; and controlling the electronic device to turn on a wireless communication unit if the geographic location is in the preset area where the preset range is located, such that the wireless communication module scans to acquire the at least one piece of data corresponding to a wireless hotspot. Thus, positioning accuracy through the positioning unit is lower.

Embodments provide that the electronic device may turn on the positioning unit in the electronic device to perform coarse positioning; for example, a GPS positioning module of a mobile phone may be turned on for positioning. A geographic location of the electronic device may be acquired through the positioning unit, and whether the geographic location is in a preset area where the preset range is located is judged. If so, the electronic device is controlled to turn on a wireless communication unit.

When a user returns home carrying a mobile phone, it is assumed that the home of the user is at a location D of a floor C in a building B of a community A; because power consumption may be high when a wireless hotspot is scanned through the wireless communication unit, the electronic device may first turn on a GPS in a mobile phone for positioning. When the mobile phone is positioned to reach the area of the community A through the GPS, the GPS is stopped. A wireless communication module of the mobile phone may be turned on to scan at least one piece of data corresponding to a wireless hotspot, and further whether the mobile phone reaches a range where the home is located is determined through one piece of data, i.e., whether the mobile phone reaches the location D in the floor C in the building B of the community A is judged. The electronic device may perform coarse positioning through the positioning unit. The wireless communication module is only turned on to detect parameters corresponding to a wireless hotspot for accurate positioning when an area where the preset range is located is positioned. Electricity waste caused by always running the wireless communication module may be avoided, and a technical effect of accurate positioning is achieved.

Embodiment 2

Referring to FIG. 2, an embodiment provides an electronic device, comprising: a wireless communication unit 201, may be configured to scan and acquire at least one piece of data corresponding to a wireless hotspot; and a processing unit 202, may be configured to monitor the at least one piece of data; to judge whether the electronic device reaches a preset range at least based on the at least one piece of data corresponding to the wireless hotspot; and to determine a corresponding instruction if the electronic device reaches the preset range.

The electronic device may also comprise: a collection unit configured to detect and acquire motion state information of the electronic device. After the collection unit collects the motion state information, the processing unit is also configured to judge whether the electronic device reaches the preset range based on the data corresponding to the wireless hotspot and the motion state information.

The electronic device may also comprise a positioning unit configured to perform positioning and to acquire a geographic location of the electronic device. When the positioning unit performs positioning to acquire the geographic location of the electronic device, the processing unit is also configured to judge whether the geographic location is in a preset area where the preset range is located and to control the electronic device to turn on the wireless communication unit if the geographic location is in the preset area where the preset range is located. Thus, the wireless communication module scans and acquires the at least one piece of data corresponding to a wireless hotspot, wherein positioning accuracy through the positioning unit is lower than that through the at least one piece of data; or the power consumed by the positioning of the positioning unit is less than that consumed by the positioning of the at least one piece of data.

Embodiment 3

Referring to FIG. 3., an embodiment provides an electronic device, comprising: a first monitoring unit 301 configured to monitor and to acquire at least one piece of data corresponding to a wireless hotspot scanned by the electronic device; a first judging unit 302 configured to judge whether the electronic device reaches a preset range at least based on the at least one piece of data corresponding to the wireless hotspot; and a first determining unit 303 configured to determine a corresponding instruction if the electronic device reaches the preset range.

The first judging unit may comprise a first judging module configured to judge whether the scanned wireless hotspot includes a preset wireless hotspot based on the identifier information corresponding to a wireless hotspot; a first acquiring module configured to detect signal strength changes used for indicating the signal strength change of the preset wireless hotspot if the scanned wireless hotspot includes the preset wireless hotspot; and a second judging module configured to judge whether the electronic device reaches the preset range based on the signal strength change information.

The second judging module may comprise a first judging submodule configured to acquire first amplitude change of the signal strength of the preset wireless hotspot within a first preset time range, and judge whether the first amplitude change is greater than a first threshold, so as to acquire a first judgment result; and a second judging submodule configured to judge whether the electronic device reaches the preset range at least based on the first judgment result.

The second judging submodule may comprise a first judging subunit configured to acquire second amplitude change of the signal strength of the preset wireless hotspot within a second preset time range, and judge whether the second amplitude change is greater than a second threshold, so as to acquire a second judgment result; and a second judging subunit configured to judge whether the electronic device reaches the preset range based on the first judgment result and the second judgment result. If the first judgment result and the second judgment result are both positive, it is determined that the electronic device reaches the preset range, and the first preset time range is not coincident with the second preset time range.

The second judging subunit may also be configured to judge whether a unit time change rate of the first amplitude change within the first preset time range and that of the second amplitude change within the second preset time range are different, so as to acquire a third judgment result; judge whether a direction change corresponding to the first amplitude change and a direction change corresponding to the second amplitude change are consistent, so as to acquire a fourth judgment result; and judge whether the electronic device reaches the preset range based on the first judgment result, the second judgment result, the third judgment result, and the fourth judgment result. If the first judgment result, the second judgment result, the third judgment result, and the fourth judgment result are all positive, it is determined that the electronic device reaches the preset range.

The second judging module may comprise a first acquiring submodule configured to acquire first change information within a third preset time range and second change information within a fourth preset time range of the signal strength of the preset wireless hotspot, wherein the third preset time range and the fourth preset time range are not coincident; a third judging submodule configured to judge whether the first change information and the second change information meet preset conditions, so as to acquire a fifth judgment result; and a fourth judging submodule, configured to judge whether the electronic device reaches the preset range. If the fifth judgment result is positive, it is determined that the electronic device reaches the preset range.

The first judging unit may comprise a second acquiring module configured to detect and to acquire motion state information of the electronic device; and a third judging module configured to judge whether the electronic device reaches the preset range based on the data corresponding to a wireless hotspot and the motion state information.

The third judging module may comprise a fifth judging submodule configured to judge whether the scanned wireless hotspot includes a preset wireless hotspot based on the identifier information corresponding to a wireless hotspot; a sixth judging submodule configured to judge whether the motion state of the electronic device is switched from a first state to a second state based on the motion state information if the scanned wireless hotspot includes the preset wireless hotspot, wherein motion amplitude corresponding to the first state and motion amplitude corresponding to the second state are different; and a first determining submodule configured to determine that the electronic device reaches the preset range if the motion state of the electronic device is switched from the first state to the second state.

The sixth judging submodule may comprise a third judging subunit configured to acquire third amplitude change of the signal strength of the preset wireless hotspot within a fifth preset time range if the motion state of the electronic device is switched from the first state to the second state; and a fourth judging subunit configured to judge whether the third amplitude change is greater than a third threshold, and determine that the electronic device reaches the preset range if so.

The electronic device may also comprise a second acquiring unit configured to turn on a positioning unit of the electronic device, and acquiring a geographic location of the electronic device through the positioning unit; a second judging unit configured to judge whether the geographic location is in a preset area where the preset range is located; and a first control unit configured to control the electronic device to turn on a wireless communication unit if the geographic location is in the preset area where the preset range is located. The wireless communication module scans to acquire the at least one piece of data corresponding to a wireless hotspot, wherein positioning accuracy through the positioning unit is lower than that through the at least one piece of data; or the power consumed by the positioning of the positioning unit is less than that consumed by the positioning of the at least one piece of data.

Those skilled in the art should realize that an embodiment may be provided as a method, a system or a computer program product. Therefore, various embodiments may use forms of a full hardware embodiment, a full software embodiment, or an embodiment that is a combination of software and hardware. Furthermore, the embodiments may use forms of computer program products implemented on one or more computer storage media or device (including, but not limited, to a magnetic disk memory device, a CD-ROM device, an optical memory device or the like), which include a computer program code.

Various embodiments are described with reference to flow diagrams and/or block diagrams. It should be understood that each flow and/or block in the flow diagrams and/or block diagrams and a combination thereof may be implemented by computer program instructions. These computer program instructions may be provided for a processor or processors of programmable data processing device(s) to generate a machine, so as to generate an apparatus configured to implement designated functions in one or more flows of a flow diagram and/or one or more blocks of a block diagram by instructions, executed by a processor.

These computer program instructions may also be stored in a computer-readable storage device such as a computer or wearable device memory that can guide a computer or other programmable data processing device(s) to work in a particular way, so that the instructions stored in the computer-readable storage device or memory generate a manufactured product including instructions that implement the designated functions in one or more flows of a flow diagram and/or one or more blocks of a block diagram. In the context of this document, a computer-readable memory or storage device is not a signal and "non-transitory" includes all media except signal media.

The computer program instructions may also be loaded on a computer or other programmable data processing devices, to execute a series of operating steps on the computer or other programmable device(s) to produce a computer executed process, so that instructions executed on the computer or other programmable device(s) provide steps that implement designated functions in one or more flows of a flow diagram and/or one or more blocks of a block diagram.

Although example embodiments have been described, those skilled in the art may make additional alterations and modifications on these embodiments. Therefore, the appended claims are intended to be interpreted as covering the example embodiments, including equivalents and all alterations and modifications falling within the ability of those having skill in the art.

It will be apparent to those skilled in the art that various modifications and variations can be made to the example embodiments without departing from the spirit and scope of the disclosure. In view of the foregoing, the non-limiting example embodiments are to be construed as covering modifications and variations thereof.

What is claimed is:

1. An electronic device, comprising:
    a wireless communication unit; and
    a processor operatively coupled to the wireless communication unit; and
    a memory that stores instructions executable by the processor to:
    scan and acquire wireless device signal data;
    determine, based on the wireless device signal data, that the electronic device is within a preset range of a wireless device;
    determine, based on the determining and without using auxiliary sensors, a geographic position of the electronic device based on the electronic device being within the preset range; and
    instruct, responsive to determining the geographic position, at least one other device to perform a function.

2. The electronic device of claim 1, further comprising:
    a collection unit that acquires motion state data of the electronic device, wherein the processing unit executes instructions to detect that the electronic device is within the preset range at least based on the motion state data.

3. The electronic device of claim 2, further comprising a sensor;
    wherein the processor executes instructions to:
    detect a change in motion state data using inputs from the sensor;
    associate the change in motion state data with the wireless device signal data; and
    thereafter resolve the geographic position of the electronic device based on the wireless device signal data and the change in motion state data.

4. The electronic device of claim 1, wherein the processor executes instructions to:
    perform positioning using global positioning satellite (GPS) data.

5. The electronic device of claim 4, wherein scanning and acquiring of the wireless device signal data is conditioned on the GPS data.

6. The electronic device of claim 5, wherein the processor executes instructions to enable the scanning and acquiring of wireless device signal data in response to detecting a predetermined geographic location using the GPS data.

7. The electronic device of claim 6, wherein the processor executes instructions to disable use of GPS data in response to enabling the scanning and acquiring of wireless device signal data.

8. The electronic device of claim 1, wherein the wireless device signal data is selected from the group consisting of media access control (MAC) address data, signal set identifier (SSID) data, and wireless signal strength data of a wireless hotspot device.

9. The method of claim 8, wherein the wireless device signal data is selected by a user.

10. The method of claim 9, wherein the wireless signal data includes wireless signal data of one or more home devices of the user.

11. A method, comprising:
    scanning and acquiring wireless device signal data using a mobile device;
    determining, based on the wireless device signal data, that the mobile device is within a preset range of a wireless device;
    determining, based on the determining and without using auxiliary sensors, a geographic position of the mobile device based on the mobile device being within the preset range; and
    instruct, responsive to determining the geographic position at least one other device to perform a function.

12. The method of claim 11, further comprising:
    acquiring motion state data of the mobile device, wherein the detecting that the mobile device is within the preset range at least based on the motion state data.

13. The method of claim 12, further comprising:
    detecting a change in motion state data using inputs from a sensor of the mobile device;
    associating the change in motion state data with the wireless device signal data; and
    thereafter resolving the geographic position of the mobile device based on the wireless device signal data and the change in motion state data.

14. The method of claim 11, further comprising performing positioning using global positioning satellite (GPS) data.

15. The method of claim 14, wherein the scanning and acquiring of the wireless device signal data is conditioned on the GPS data.

16. The method of claim 15, further comprising enabling the scanning and acquiring of wireless device signal data in response to detecting a predetermined geographic location using the GPS data.

17. The method of claim 16, further comprising disabling use of GPS data in response to enabling the scanning and acquiring of wireless device signal data.

18. The method of claim 11, wherein the wireless device signal data is selected from the group consisting of media access control (MAC) address data, signal set identifier (SSID) data, and wireless signal strength data of a wireless hotspot device.

19. The method of claim 8, wherein the wireless device signal data is selected by a user.

20. A computer program product, comprising:
    a computer readable storage device comprising code that is executable by a processor, the code comprising:
    code that scans and acquires wireless device signal data using a mobile device;
    code that determines, based on the wireless device signal data, that the mobile device is within a preset range of a wireless device;
    code that determines, based on the code that determines and without using auxiliary sensor data, a geographic position of the mobile device based on the mobile device being within the preset range; and code that instructions, responsive to determining the geographic position, at least one other device to perform a function.

\* \* \* \* \*